US012585264B2

(12) United States Patent (10) Patent No.: US 12,585,264 B2
Iimuro et al. (45) Date of Patent: Mar. 24, 2026

(54) WORK MACHINE AND WORK MACHINE MANAGEMENT SYSTEM TRANSMITTING INFORMATION ACCORDING TO PRIORITY

(71) Applicant: HITACHI CONSTRUCTION MACHINERY CO., LTD., Tokyo (JP)

(72) Inventors: Satoshi Iimuro, Tokyo (JP); Mitsuhiro Kitani, Tokyo (JP); Bandara Syafril, Tokyo (JP); Shigeru Miwa, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 465 days.

(21) Appl. No.: 18/023,504

(22) PCT Filed: Oct. 22, 2021

(86) PCT No.: PCT/JP2021/039161
§ 371 (c)(1),
(2) Date: Feb. 27, 2023

(87) PCT Pub. No.: WO2022/097507
PCT Pub. Date: May 12, 2022

(65) Prior Publication Data
US 2023/0315080 A1      Oct. 5, 2023

(30) Foreign Application Priority Data

Nov. 4, 2020    (JP) ................................. 2020-184244

(51) Int. Cl.
*G05B 23/02*          (2006.01)
(52) U.S. Cl.
CPC ................................. *G05B 23/0264* (2013.01)
(58) Field of Classification Search
CPC ...... E02F 9/267; E02F 9/2054; G05B 19/042; G05B 23/0264; G05B 2219/45012
(Continued)

(56) References Cited

U.S. PATENT DOCUMENTS

2002/0059320 A1* 5/2002 Tamaru ................... E01C 19/00
2005/0002354 A1* 1/2005 Kelly ...................... H04L 45/04
370/329

(Continued)

FOREIGN PATENT DOCUMENTS

CN        105518554 A      4/2016
CN        108965377 A     12/2018
(Continued)

OTHER PUBLICATIONS

International Search Report of PCT/JP2021/039161 dated Dec. 14, 2021.
(Continued)

*Primary Examiner* — Jigneshkumar C Patel
(74) *Attorney, Agent, or Firm* — MATTINGLY & MALUR, PC

(57)                ABSTRACT

Provided is a work machine and a work machine management system that enable more appropriate transmission of information of a high-priority work machine even when there is a large number of work machines. A work machine 10 comprises an information controller 20. The information controller 20 acquires operation information of the work machine 10; receives management server information from a management server 90 provided outside the work machine 10; determines a transmission priority order of the operation information based on content of the operation information and the management server information; and transmits the operation information to the management server 90 or a relay 80 according to the transmission priority order.

7 Claims, 8 Drawing Sheets

(58) Field of Classification Search
USPC ........................................................... 700/79
See application file for complete search history.

(56) References Cited

U.S. PATENT DOCUMENTS

| | | | | | |
|---|---|---|---|---|---|
| 2007/0142990 | A1* | 6/2007 | Moughler | ................ | G07C 5/00 |
| | | | | | 701/50 |
| 2008/0140435 | A1* | 6/2008 | Arakawa | ................. | E02F 9/267 |
| | | | | | 705/1.1 |
| 2011/0276842 | A1* | 11/2011 | Shibamori | ................ | E02F 9/26 |
| | | | | | 714/49 |
| 2015/0279123 | A1* | 10/2015 | Yamanobe | ............. | G07C 5/008 |
| | | | | | 340/425.5 |
| 2016/0226977 | A1 | 8/2016 | Fujiwara et al. | | |
| 2017/0328031 | A1* | 11/2017 | Jang | ......................... | E02F 9/265 |
| 2019/0066005 | A1 | 2/2019 | Margherio et al. | | |
| 2021/0056772 | A1 | 2/2021 | Sakurai | | |

FOREIGN PATENT DOCUMENTS

| | | |
|---|---|---|
| JP | 2002180502 A | 6/2002 |
| JP | 2009-214994 A | 9/2009 |
| JP | 2011070397 A | 4/2011 |
| JP | 2011221813 A | 11/2011 |
| JP | 2012160085 A | 8/2012 |
| JP | 2013194440 A | 9/2013 |
| JP | 2019175360 A | 10/2019 |

OTHER PUBLICATIONS

Chinese Office Action received in corresponding Chinese Application No. 202180052660.2 dated May 28, 2025.

* cited by examiner

| Identification ID | Failure probability | Work importance level | Availability of replacement machine | Risk evaluation value | Vehicle body priority level |
|---|---|---|---|---|---|
| 1111 | Low | Low | Yes | 20 | 4 |
| 2222 | Middle | Low | No | 40 | 3 |
| 3333 | High | High | No | 70 | 1 |
| 4444 | High | Middle | Yes | 50 | 2 |

(b)

| Identification ID | Failure probability | Work importance level | Availability of replacement machine |
|---|---|---|---|
| 1111 | Low | Low | Yes |
| 2222 | | | |
| 3333 | High | High | No |
| 4444 | High | Middle | Yes |

Enter failure risk information of vehicle body ID = 2222 (machine type=shovel)

1. Failure probability = middle
2. Work importance level = low
3. Replacement machine availability = ?

| Information code | Information type | Importance level |
|---|---|---|
| 100 | Overheat | High |
| 200 | Decrease in engine hydraulic pressure | High |
| 300 | Decrease in hydraulic pump ejection pressure | High |
| 400 | Filter clogging | Middle |
| : | : | : |
| 9800 | Engine start | Low |
| 9900 | Engine stop | Low |

| Vehicle body priority level | Transmission priority order | | |
|---|---|---|---|
| | High | Middle | Low |
| 1 | 1 | 2 | 4 |
| 2 | 3 | 5 | 7 |
| 3 | 6 | 8 | 10 |
| 4 | 9 | 11 | 12 |

FIG. 8

| Transmission destination ID | Transmission source ID | Transmission priority order | Information code | Operation information body data |
|---|---|---|---|---|

WORK MACHINE AND WORK MACHINE MANAGEMENT SYSTEM TRANSMITTING INFORMATION ACCORDING TO PRIORITY

TECHNICAL FIELD

The present invention relates to a work machine and a work machine management system.

BACKGROUND ART

In recent years, there has been an increasing demand for performing monitoring for watching over and maintaining a work machine remotely from a management center away from the site. Thus, it has become increasingly common to transmit the operation information of a work machine to the management center in real time or within a predetermined time, through a mobile communication network, a communication satellite, and the like. On the management center side, the collected operation information may be analyzed to identify the cause of a failure of the work machine, or to detect a sign of impending abnormality and take measures by, e.g., arranging for component replacement in advance.

However, due to the capacity of traffic that can be transmitted on a network, it is often difficult to collect all of the operation information data at all times on the center side.

Typically, for example, there are cases where the work site in which the work machine is operated is deep in the mountains and out of the area of coverage by a mobile communication network. Even if the site is within the coverage area, radio waves may be unreachable, such as in a tunnel, so that direct communication with the management center is impossible. In such work sites where direct communication is impossible, ad hoc network technology using wireless multi-hop communication, a delay tolerant network technology using store-carry-forward, or the like may be used to relay and transmit the operation information of the work machine to the center when direct communication with the center cannot be performed. However, in this case, there are limitations such as a limit to the storage capacity of the intervening relays, and a limit to the capacity of traffic that can be transmitted by wireless communication for relaying. Accordingly, it is difficult to store and transmit all of the operation information to the management center.

Such problem is often addressed by, upon detection of abnormality in the work machine, storing the operation information as snap-shot data only within a predetermined period (before and after the occurrence of the abnormality) with reference to the time of occurrence of the abnormality, and then transmitting the stored data to the management center.

In this case, too, if the amount of information reaches the upper limit of the storage area of the work machine before transmission to the management center occurs, some of the snap shots would have to be deleted. Accordingly, this requires considerations so that necessary snap shots are left preferentially.

For example, in the conventional technology according to Patent Literature 1, each type (abnormality code) of abnormality included in snap-shot data is given a priority order. If a new abnormality arises when there is no space to store new snap-shot data, the snap-shot data for the new abnormality is stored in place of past snap-shot data having a priority order lower than the priority order of the new abnormality if there is such past snap-shot data among the snap-shot data stored in the past.

In this way, the snap-shot data of the abnormality with a higher priority order can be preferentially stored. Thus, the snap-shot data of an abnormality with a high level of response emergency can be reliably saved and output to the management-side terminal.

CITATION LIST

Patent Literature

Patent Literature 1: JP 2011-70397 A

SUMMARY OF INVENTION

Technical Problem

However, according to the conventional technology, if the number of the work machines is large, there is the issue that the information of a high-priority work machine may fail to be transmitted appropriately.

At a work site, a large number and variety of work machines, such as wheel loaders and shovels, may operate together. If the number of work machines operating per work site is large, even if the amount of data of operation information from each work machine is limited by technologies such as according to Patent Literature 1, the amount of data of the entire operation information from all of the work machines operating at the work site may exceed the upper limit of the capacity of traffic that can be transmitted by a network, as described above. As a result, it may become impossible to transmit all of the operation information of the work machines to the management center at all times.

In such a case, generally by the principle of first-in, first-out, the work machine that transmitted data earlier is given priority, and later-transmitted data of a work machine is discarded. The discarded data will be either completely lost and fail to reach the center, or may be retransmitted several times and then reach the center with a significant delay. This may prevent diagnosis of a case for which a sign of failure could have been diagnosed, or lead to a response that is too late.

Meanwhile, the priority (e.g., necessity of monitoring) of respective work machines operating at a certain work site may vary from one work machine to another. For example, some work machines may be still new and be less likely to develop a failure, while some other work machines may be older and/or may have been abused, and may more likely to fail. Or, one work machine, for reasons such as it being responsible for an important step of the work plan at the work site, or being such that a replacement machine is hard to obtain, may have a large impact in the event of failure, another work machine may not.

Accordingly, for those with a large failure risk (likelihood of failure, and the level of impact in the event of failure), it is desirable to reliably diagnose the failure or a sign thereof, and to take measures quickly. Further, other than failure risks, it is also desirable to reliably collect information of a high-priority work machine.

An object of the present invention is to provide a work machine and a work machine management system that allow information of a high-priority work machine to be more appropriately transmitted even when there is a large number of work machines.

Solution to Problem

An example of a work machine according to the present invention includes a controller that acquires first operation information of the work machine and receives management server information from a management server provided outside the work machine, wherein:

the first operation information includes information indicating at least one of a key signal, an overheat signal, an engine hydraulic pressure, an engine actual rotational speed, a water temperature, an air filter pressure difference, or a main hydraulic pump pressure;

the management server information includes a vehicle body priority level indicating a priority order between the work machine and another work machine, and at least one of a failure probability of the work machine, an importance level of the work machine in an on-site work, or a probability that the work machine can be replaced by another work machine; and the controller determines a transmission priority order of the first operation information based on content of the first operation information and the management server information, and transmits the first operation information to the management server or a relay according to the transmission priority order.

An example of a work machine management system according to the present invention includes the work machine and the management server described above, wherein the management server determines the vehicle body priority level based on at least one of a failure probability of the work machine, an importance level of the work machine in an on-site work, or a probability that the work machine can be replaced by another work machine.

The present description incorporates the disclosure of JP Patent Application No. 2020-184244 that forms the basis of the priority claim of the present application.

Advantageous Effects of Invention

The work machine and the work machine management system according to the present invention can transmit information of a high-priority work machine more appropriately, even when there is a large number of work machines.

BRIEF DESCRIPTION OF DRAWINGS

FIG. 1 illustrates an example of the exterior configuration of a work machine according to Example 1.

FIG. 3 illustrates an example of failure risk information according to Example 1.

FIG. 6 illustrates a data structure example of an importance level correspondence table according to Example 1.

FIG. 7 illustrates a data structure example of a priority order determination table according to Example 1.

FIG. 8 illustrates a packet format example of operation information used in Example 1

DESCRIPTION OF EMBODIMENTS

Figure 2:
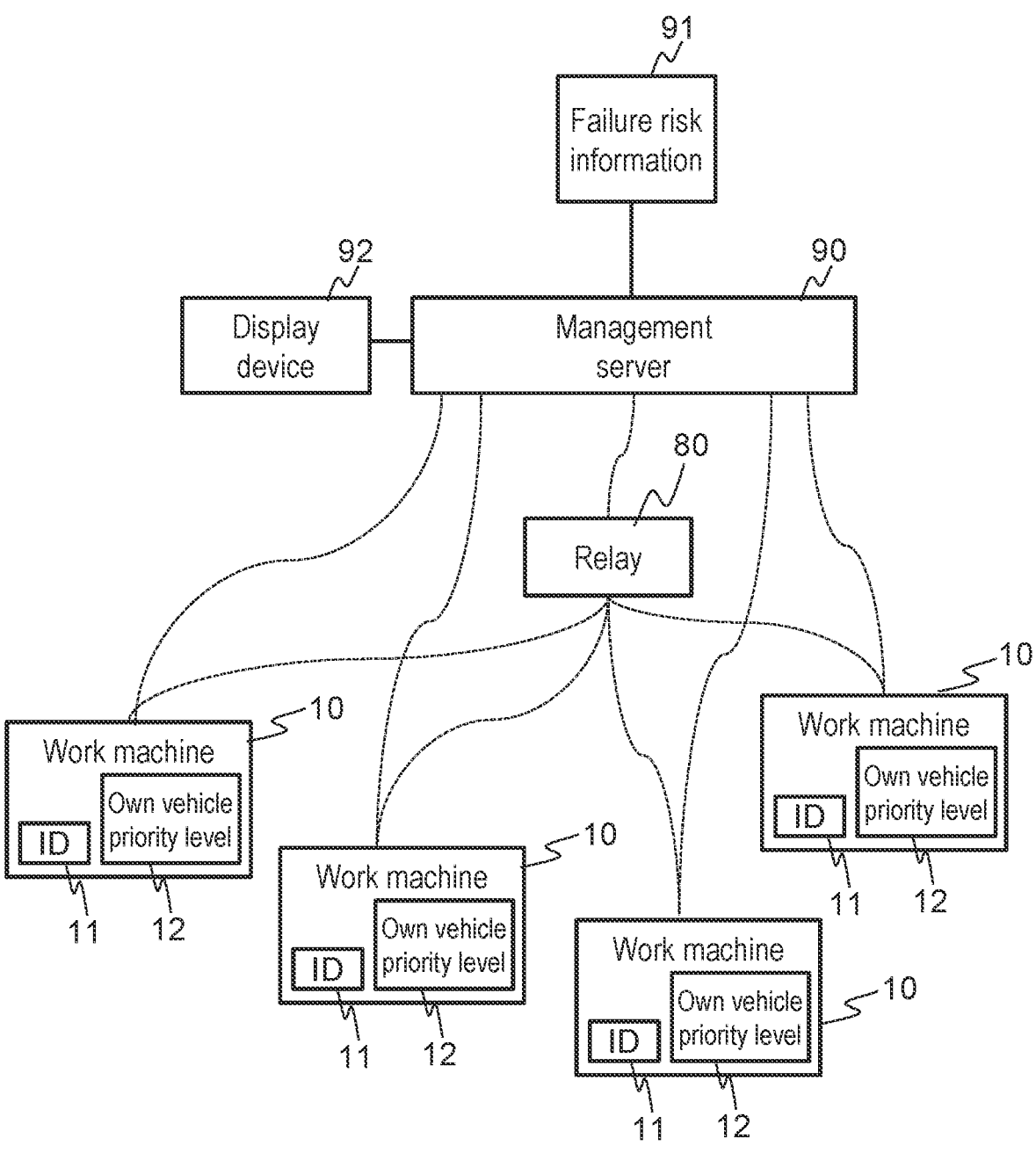
FIG. 2 illustrates a configuration example of a work machine management system according to Example 1.

In the following, reference is made to the attached drawings to describe the present embodiment. In the attached drawings, functionally similar elements may be depicted with similar numerals. While the attached drawings illustrate examples in accordance with the principles of the present disclosure, these are for the purpose of understanding the present disclosure, and should not be used to interpret the present disclosure in a limited sense. The description provided herein is merely exemplary and does not limit the scope of the claims of this disclosure or application examples thereof in any sense.

While the examples are described in sufficient detail to enable a person skilled in the art to practice the present disclosure, it is to be understood that other implementations or forms are also possible, and that configuration and structural variations and substitutions of various elements may be made without departing from the technical scope and spirit of the present disclosure. Accordingly, the following description is not to be taken in a limited sense.

Example 1

Figure 1:
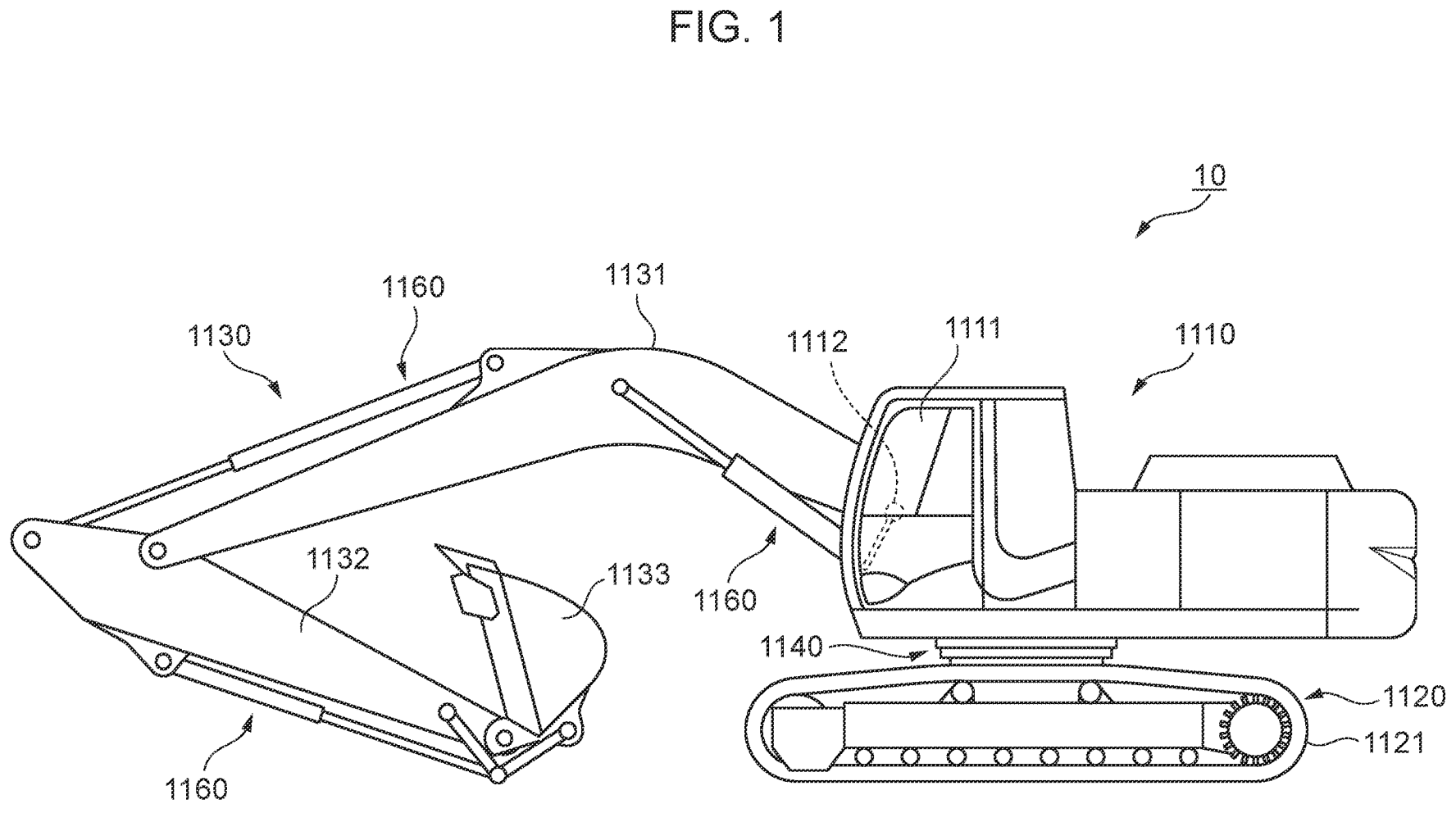

FIG. 1 illustrates an example of the exterior configuration of a work machine according to Example 1 of the present invention. The work machine 10 of Example 1 is a hydraulic shovel as an example, and includes, for example, an upper revolving structure 1110, a lower travelling structure 1120, a work implement 1130, a revolving mechanism 1140, and a cylinder 1160.

The upper revolving structure 1110 is mounted on top of the lower travelling structure 1120 rotatably via the revolving mechanism 1140. The upper revolving structure 1110 is fitted with a cab 1111 for an operator to perform driving. The cab 1111 is equipped with an operating lever 1112 for the operator to operate the work machine 10.

The upper revolving structure 1110 revolves with respect to the lower travelling structure 1120 around a rotational axis parallel to the height direction of the work machine 10. The upper revolving structure 1110 houses hydraulic devices including an engine and the like. The lower travelling structure 1120 includes tracks 1121 that are driven by, e.g., a hydraulic motor, not shown. The lower travelling structure 1120 allows the work machine 10 to travel under the control of a control system, which will be described below.

The work implement 1130 is provided in front of the upper revolving structure 1110, for example. The work implement 1130 is driven by the cylinder 1160 to perform a work, such as an excavation work. The work implement 1130 includes, for example, a boom 1131, an arm 1132, and a bucket 1133. The revolving mechanism 1140 includes a hydraulic motor or an electric motor, which are not shown. The revolving mechanism 1140, under the control of the control system which will be described below, causes the upper revolving structure 1110 to revolve with respect to the lower travelling structure 1120, around the rotational axis parallel to the height direction of the work machine 10.

Other examples of the work machine include a wheel loader, a bulldozer, and a dump truck.

FIG. 2 illustrates a configuration example of a work machine management system according to Example 1. The work machine management system is provided for a single work site, for example. Alternatively, the work machine management system may be provided across a plurality of work sites, or a plurality of work machine management systems may be provided for a single work site.

The work machine management system comprises a plurality of work machines 10, and a management server 90. In the example of FIG. 2, the plurality of work machines 10 operate in the same work site. The operation information of these work machines 10 is collected by the management server 90. The management server 90 is a computer provided outside the work machines 10, and may be installed in a management center, for example.

Each work machine 10 stores an identification ID 11 identifying the work machine. Further, each work machine 10 stores an own vehicle priority 12 (described below).

The management server 90 may be constructed using a known computer, and comprises, for example, a computing means, a storage means, an input means, and an output means. The computing means includes a processor, for example. The storage means includes a semiconductor storage medium and a magnetic disk, for example. The input means includes a keyboard and a mouse, for example. The output means includes a display device 92 and a printing device. The storage means may store a program. The program may be executed by the computing means so that the management server 90 can implement the functions described herein.

The management center is located at a location away from the work machines 10, for example. The management server 90 and the work machines 10 are connected by means of long-distance communication (for example, the fourth-generation mobile communication or satellite communication).

It is noted that long-distance communication may not be available depending on the work site, as discussed above. In that case, the work machine management system may comprise a relay 80, so that the relay 80 can relay communication. The relay 80 is installed in the same work site as the work machines 10. The relay 80 is connected to the work machines 10 by means of, e.g., wireless LAN communication according to the IEEE802.11 standard, or short-distance wireless communication according to the IEEE802.15.4 standard.

The relay 80 may be mounted on a work machine 10 and constitute a part of the work machine 10, or the work machine 10 may comprise the function of the relay 80. In this case, the work machine 10 can perform data transmission and reception with the management server 90 via one or more other work machines 10 by means of short-distance communication.

The management server 90 stores failure risk information 91 of the work machines 10 operating at the work site (such as all relevant work machines 10). FIG. 3 shows examples of the failure risk information 91. FIG. 3(a) shows a configuration example of the failure risk information 91. The failure risk information 91 is configured as a table in which the failure risk information for each identification ID (corresponding to the identification ID 11 of FIG. 2) of the work machines 10 is registered. Each record of the failure risk information 91 includes the fields for failure probability, work importance level, the availability of replacement machine, risk evaluation value, and vehicle body priority level.

The failure probability indicates the failure probability of the work machine 10, and is indicated by the three levels of High, Middle, and Low, for example. The failure probability may be determined by the manager of the work site based on the total operation time, past failure history, and the like of the work machine 10.

The work importance level indicates the importance level of the work machine 10 for the on-site work. For example, it indicates how important the step that the work machine is responsible for is at the work site in terms of the work plan. The work importance level is indicated by the three levels of High, Middle, and Low. The work importance level may be determined by the manager based on the schedule margin for the step with which the work machine 10 is involved, the relationship between the step and a subsequent step, and the like.

The availability of replacement machine is an example of information indicating the probability that the work machine 10 can be replaced by another work machine 10. For example, if a spare machine that can be used as a replacement for the work machine 10 is prepared at the work site, an agent, or the like, the availability of replacement machine is "Yes"; otherwise, "No". The availability of replacement machine may be determined by the manager.

The setting values for the above-described fields for failure probability, work importance level, and the availability of replacement machine are input to the management server 90 by the manager of the work site, for example. The management server 90 stores the input information as the failure risk information 91.

FIG. 3(b) is an example of an input interface screen for inputting the information used for determining the vehicle body priority level (for example, failure probability, work importance level, and the availability of replacement machine). In this example, for the work machine 10 with the vehicle body identification ID 2222, the availability of replacement machine is indicated as "?", thus prompting the input of the availability of replacement machine.

The risk evaluation value of FIG. 3(a) is a value obtained through comprehensive evaluation of the failure probability, work importance level, and the availability of replacement machine. For the failure probability and work importance level, for example, High is given 30 points; Middle 20 points; and Low 10 points. For the availability of replacement machine, for example, Yes is given 0 points, and No is given 10 points. The management server 90 adds up these scores to calculate a risk evaluation value for each work machine 10.

The vehicle body priority level indicates the order of priority between the work machines, and indicates, for example, the priority order of each work machine with respect to one or more other work machines. The management server 90 determines the vehicle body priority level in order of decreasing risk evaluation value.

The vehicle body priority level determined as described above is delivered as management server information from the management server 90 to each work machine 10 by long-distance wireless communication or via the relay 80. Each work machine 10 receives the management server information and stores the vehicle body priority level included in the management server information as its own vehicle priority 12 (FIG. 2).

The failure risk information may be generated by other methods. For example, the respective fields for failure probability, work importance level, and the availability of replacement machine may be automatically determined by the management server 90 through communication with other computers (for example, a vehicle body management system, a work plan system, and an agent system). Further, the risk evaluation value may be obtained not by simple summation, but by performing addition after each item is multiplied by a coefficient indicating how much emphasis should be put on each item.

The vehicle body priority level may be indicated not as a simple order but as a deviation value taking the distribution of the risk evaluation values into consideration. Further, when the vehicle body priority level is determined, it is not necessary to refer to all of the information shown in FIG. 3(a). For example, the management server 90 may determine the vehicle body priority level based on at least one of the failure probability, work importance level, or the availability of replacement machine. In this case, the input interface screen of FIG. 3(b) is used for inputting at least one of the failure probability, work importance level, or the availability of replacement machine.

Figure 4:
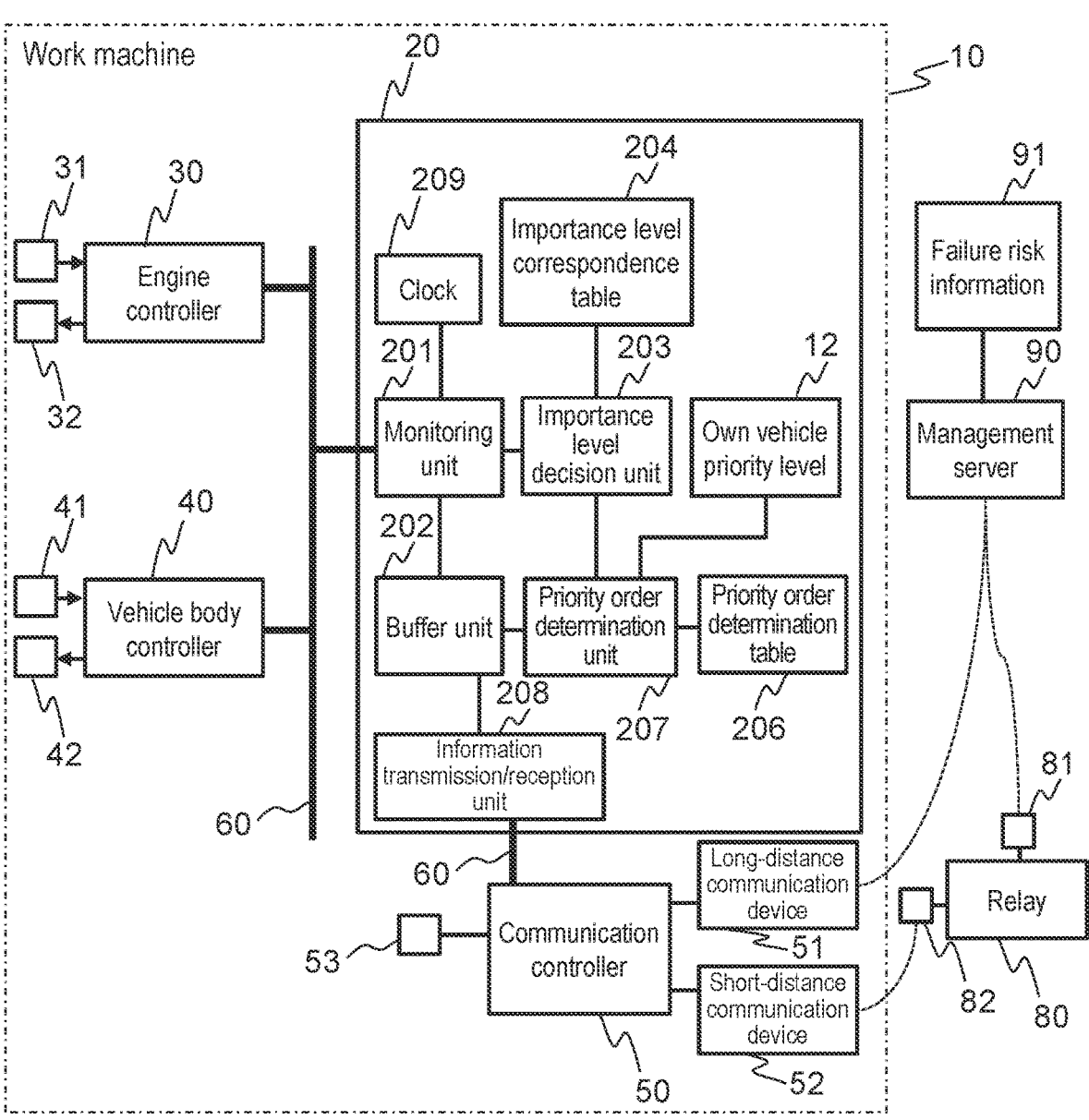
FIG. 4 is a diagram for describing the configuration of the work machine of Example 1 and a relay in greater detail.

Next, reference is made to the block diagram of FIG. 4, and the configuration of the work machine 10 and the relay 80 of the present example is described in greater detail.

The work machine 10 comprises a controller as a control system according to the present embodiment. The controller includes an information controller 20, an engine controller 30, a vehicle body controller 40, and a communication controller 50. The information controller 20, the engine controller 30, the vehicle body controller 40, and the communication controller 50 are mutually connected via a vehicle body network 60.

The information controller 20 may be constructed using a known computer, for example, and comprises a computing means and a storage means, for example. The computing means includes a processor, for example. The storage means includes a semiconductor storage medium and/or a magnetic disk, for example. The storage means may store a program. The program may be executed by the computing means so that the information controller 20 can implement the functions described herein.

The engine controller 30, the vehicle body controller 40, and the communication controller 50 may also be constructed using known computers. Two or more of the information controller 20, the engine controller 30, the vehicle body controller 40, and the communication controller 50 may be implemented by one computer, or the information controller 20 may be implemented by two or more computers.

The information controller 20 acquires operation information of the work machine 10 (first operation information). For example, the operation information is detected by the engine controller 30 and the vehicle body controller 40 and transmitted via the vehicle body network 60. The information controller 20 receives and acquires the operation information.

The information controller 20 transmits the acquired operation information to the management server 90 at a predetermined time interval (for example, once every day, or once per hour) via the communication controller 50.

The engine controller 30 controls an electronic governor provided in the engine. The engine controller 30 may comprise various sensors 31, such as an engine actual rotational speed sensor. The engine controller 30 acquires detection signals from the various sensors 31. The engine controller 30 controls the amount of injection of fuel. The engine controller 30, in order to control the engine rotational speed and output torque, outputs command signals to device units 32 including the electronic governor.

The vehicle body controller 40 controls a hydraulic drive device of the work machine 10. The hydraulic drive device includes, as constituent elements thereof, the following hydraulic device units:

a hydraulic pump rotationally driven by the engine;

a plurality of hydraulic actuators driven by means of hydraulic fluid ejected from a hydraulic pump to drive members to be driven, such as the work implement 1130;

control valves for controlling the flow of hydraulic fluid supplied from the hydraulic pump to the hydraulic actuators; and the operating lever 1112 (FIG. 1) for operating the control valves to drive corresponding hydraulic actuators.

The hydraulic actuators include a boom hydraulic cylinder, an arm hydraulic cylinder, and a bucket hydraulic cylinder for respectively driving the boom 1131, the arm 1132, and the bucket 1133 of FIG. 1. The hydraulic actuators further include a travelling hydraulic motor for causing the lower travelling structure 1120 to travel, a revolving hydraulic motor for causing the upper revolving structure 1110 to revolve, and the like.

The vehicle body controller 40 acquires detection signals from various sensors 41, including a detection sensor for detecting the amount of operation of the operating lever 1112. The vehicle body controller 40 controls the tilt angle (capacity) of the hydraulic pump, and outputs a command signal to each device unit 42, such as a regulator, to eject a flow volume corresponding to the amount of operation.

The communication controller 50 controls the transmission and reception with the management server 90 via a long-distance communication device 51. Further, the communication controller 50 controls the transmission and reception with the relay 80 via a short-distance communication device 52.

Further, the communication controller 50 receives position information and time information from a GPS satellite via a GPS antenna 53.

The relay 80 receives information transmitted from the work machine 10 via a short-distance communication device 82, and relays and transmits the information to the management server 90 via a long-distance communication device 81.

The information controller 20 comprises, as functional blocks, a monitoring unit 201; a buffer unit 202; an importance level decision unit 203 for operation information; an importance level correspondence table 204; the own vehicle priority 12 (vehicle body priority level of the own vehicle); a transmission data priority order determination table 206; a transmission data priority order determination unit 207; an information transmission/reception unit 208; and an internal clock 209, for example. The information controller 20 can function as these functional blocks.

Figure 5:
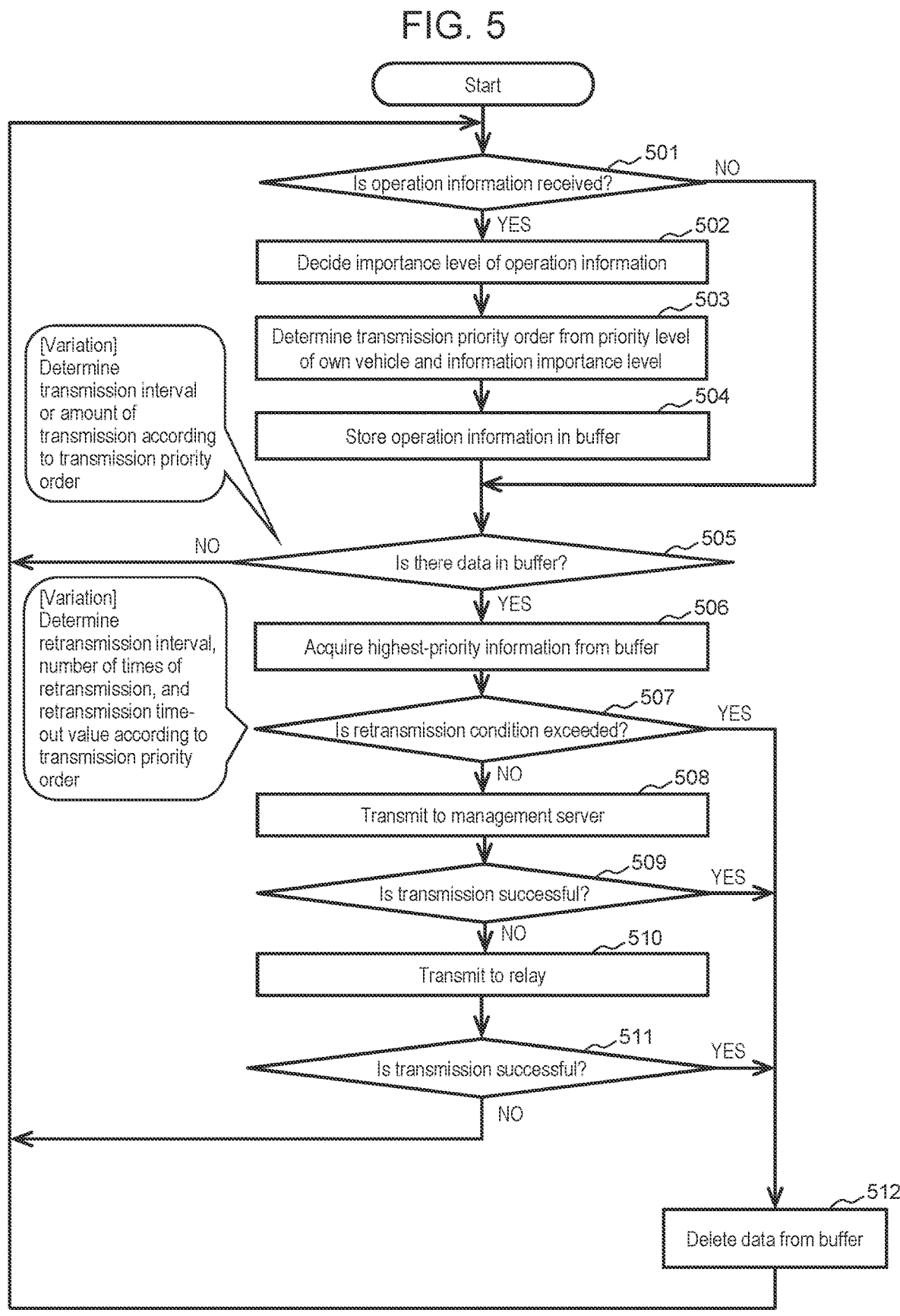
FIG. 5 is a flowchart for describing a process example of an information controller of Example 1.

Next, the process of the information controller 20 is described. FIG. 5 is a flowchart for describing a process example of the information controller 20.

First, in step 501, the monitoring unit 201 receives operation information from the engine controller 30 and the vehicle body controller 40 via the vehicle body network 60. The operation information includes the operation status of the work machine 10, for example.

Examples of the various sensors 31, 41 include a key signal sensor, an overheat signal sensor, an engine hydraulic sensor, an engine actual rotational speed sensor, a water temperature sensor, an air filter pressure difference sensor, and a main hydraulic pump pressure sensor. As a specific example of the operation information, information indicating at least one of a key signal, an overheat signal, an engine hydraulic pressure, an engine actual rotational speed, a water temperature, an air filter pressure difference, or a main hydraulic pump pressure may be utilized.

For example, the overheat signal sensor detects an overheat signal which is emitted when the engine cooling water temperature becomes higher than or equal to a setting value. The engine hydraulic sensor detects the engine hydraulic pressure to detect abnormality in an engine oil circulation system. For example, if the engine hydraulic pressure is lower than or equal to a predetermined threshold value, an occurrence of abnormality, such as an oil leak in the engine oil circulation system, is detected. While description of the other sensors is omitted, known sensors may be used therefor, as appropriate.

If no operation information is acquired, the process proceeds to step 505. On the other hand, if the operation information is acquired, the importance level decision unit 203 in step 502 decides the importance level of the operation information. For the decision, the importance level correspondence table is used. This will be described with reference to FIG. 6.

FIG. 6 shows a data structure example of the importance level correspondence table 204. Each record corresponds to one type of the operation information. Each record includes the fields for: an information code indicating the type of operation information; an information type indicating the designation (character string) of the type of operation information; and an importance level indicating the importance level of the operation information. The importance level decision unit 203 identifies the type of the acquired operation information based on the information code, to thereby decide the importance level of the operation information. While the importance level here is indicated by the three levels of High, Middle, and Low, this is not a limitation.

Next, in step 503, the priority order determination unit 207 determines the priority order with which the operation information should be processed. For the determination, the own vehicle priority 12 and the priority order determination table are used. This will be described with reference to FIG. 7.

FIG. 7 shows a data structure example of the priority order determination table 206. The priority order determination table 206 is shown as a matrix. In the matrix, the vertical axis shows vehicle body priority level, and the lateral axis shows the importance level of the operation information. FIG. 7 shows the transmission priority order with respect to each of the vehicle body priorities of 1 to 4 (1 is highest and 4 is lowest), for the three cases where the importance level of the operation information is High, Middle, and Low.

At the corresponding position of the matrix, the transmission priority order for the relevant combination is noted, wherein the smaller values indicate higher priority. In the case of this example, the setting is such that even when the importance level of the operation information is High, the transmission priority order is lowered if the priority of the vehicle body is lower. For example, when the vehicle body priority level is 4 (lowest), even if the importance level of the operation information is High (highest), the transmission priority order is 9. This transmission priority order is lower than the transmission priority order of 4 for the vehicle body priority level of 1 (highest) and the operation information priority of Low (lowest).

In this way, the priority order determination unit 207 determines the transmission priority order of the operation information based on the content of the operation information (i.e., type) and the management server information (for example, the vehicle body priority level included in the management server information).

By thus setting the transmission priority order, it is possible to give priority to the operation information of an important work machine (for example, a work machine having a higher risk of failure and a higher necessity of monitoring) over a less important work machine.

Next, in step 504, the content of the operation information are stored in the buffer unit 202, together with the transmission priority order determined as described above and the time of the internal clock 209. At this point, the time of the internal clock 209 may have been corrected by GPS time information received by the communication controller 50.

In step 505, it is decided whether there is operation information stored in the buffer unit 202. If there is no operation information stored in the buffer unit 202, the process returns to step 501 to wait for reception of the operation information. On the other hand, if operation information is stored in the buffer unit 202, the operation information having the highest transmission priority order is acquired from the buffer unit 202 in step 506.

In step 507, a retransmission condition for the acquired operation information may be confirmed. If the retransmission condition is not satisfied (step 507: YES; for example, when a predetermined number of retransmissions is exceeded, or a predetermined retransmission time-out time is passed), transmission failure may be recognized, and the process may proceed to step 512.

On the other hand, if the retransmission condition is satisfied (step 507: NO), the information transmission/reception unit 208 in step 508 transmits the operation information to the management server via the communication controller 50. For this communication, long-distance communication is used.

As a variation, the information controller 20 may determine the retransmission condition in accordance with the transmission priority order. For example, at least one of an operation information retransmission interval, the number of retransmissions of the operation information, or an operation information retransmission time-out value may be determined in accordance with the transmission priority order.

More specifically, for a higher transmission priority order, the retransmission interval is decreased, such as to one second, and for a lower transmission priority order, the retransmission interval is increased, such as to 10 seconds. Alternatively, for a higher transmission priority order, the number of retransmissions is increased, such as to 10 times, and for a lower transmission priority order, the number of retransmissions is decreased, such as to three times. Alternatively, for a higher transmission priority order, the retransmission time-out is increased, such as to 10 minutes, and for a lower transmission priority order, the retransmission time-out is decreased, such as to one minute.

In step 509, success or failure of the communication in step 508 is confirmed. If successful, the process proceeds to step 512. If the communication was unsuccessful, the information transmission/reception unit 208 in step 510 transmits the operation information to the relay 80 via the communication controller 50. For this communication, short-distance communication is used. In step 511, success or failure of the communication in step 510 is confirmed. The confirmation of success or failure may be performed with respect to the management server 90, for example. This confirmation process may be relayed by the relay 80. If the communication was successful, the process proceeds to step 512 to delete the relevant operation information from the buffer unit 202, and then returns to step 501.

On the other hand, if the communication was unsuccessful in step 511, the number of retransmissions of the operation information in the buffer unit 202 is increased by one, and then the process returns to step 501.

In this way, in steps 506 to 511, the information controller 20 transmits the operation information according to the transmission priority order.

During the transmission to the relay 80 in step 510, transmission priority order is associated with the operation information and transmitted. This will be described with reference to FIG. 8.

FIG. 8 shows a packet format example of the operation information used in Example 1. The packet format is used by short-distance communication, for example. The packet includes a transmission destination ID, a transmission source ID, a transmission priority order, an information code, and operation information body data. Here, the transmission destination ID is the identification information of the management server 90 to which the operation information is originally intended to be sent, and is, for example, its IP address. The transmission source ID is the identification ID 11 of the work machine 10 that created the packet.

As will be described below, the relay 80 can know which packet among a plurality of received packets should be preferentially processed, by referring to the transmission priority order field.

The information code corresponds to the information code of FIG. 6. The operation information body data includes the operation information per se that is to be transmitted to the management server 90.

Here, as a variation, the information controller 20 may determine the transmission interval or the amount of transmission of the operation information in accordance with the transmission priority order. The transmission interval means a temporal interval at which step 505 of FIG. 5, for example, is performed. For example, for the operation information having a higher transmission priority order, step 505 may be performed more frequently.

The amount of transmission means the amount of the operation information that is transmitted in a single transmission process, and is indicated in bits or bytes, for example. The unit of the number of times of the transmission process may be defined as appropriate by a person skilled in the art. For example, a process of transmitting one packet illustrated in FIG. 8 corresponds to a single transmission process.

As a specific example, when the transmission priority order is High, the entire operation information is transmitted, whereas when the transmission priority order is Low, only part of the operation information is transmitted and the remaining portions are discarded. For example, a portion of the operation information that is not important (such as low order bits) may be omitted. Alternatively, when the operation information is acquired every minute, the operation information acquired at every 10 minutes may be transmitted and the operation information acquired at other times may be discarded.

Figure 9:
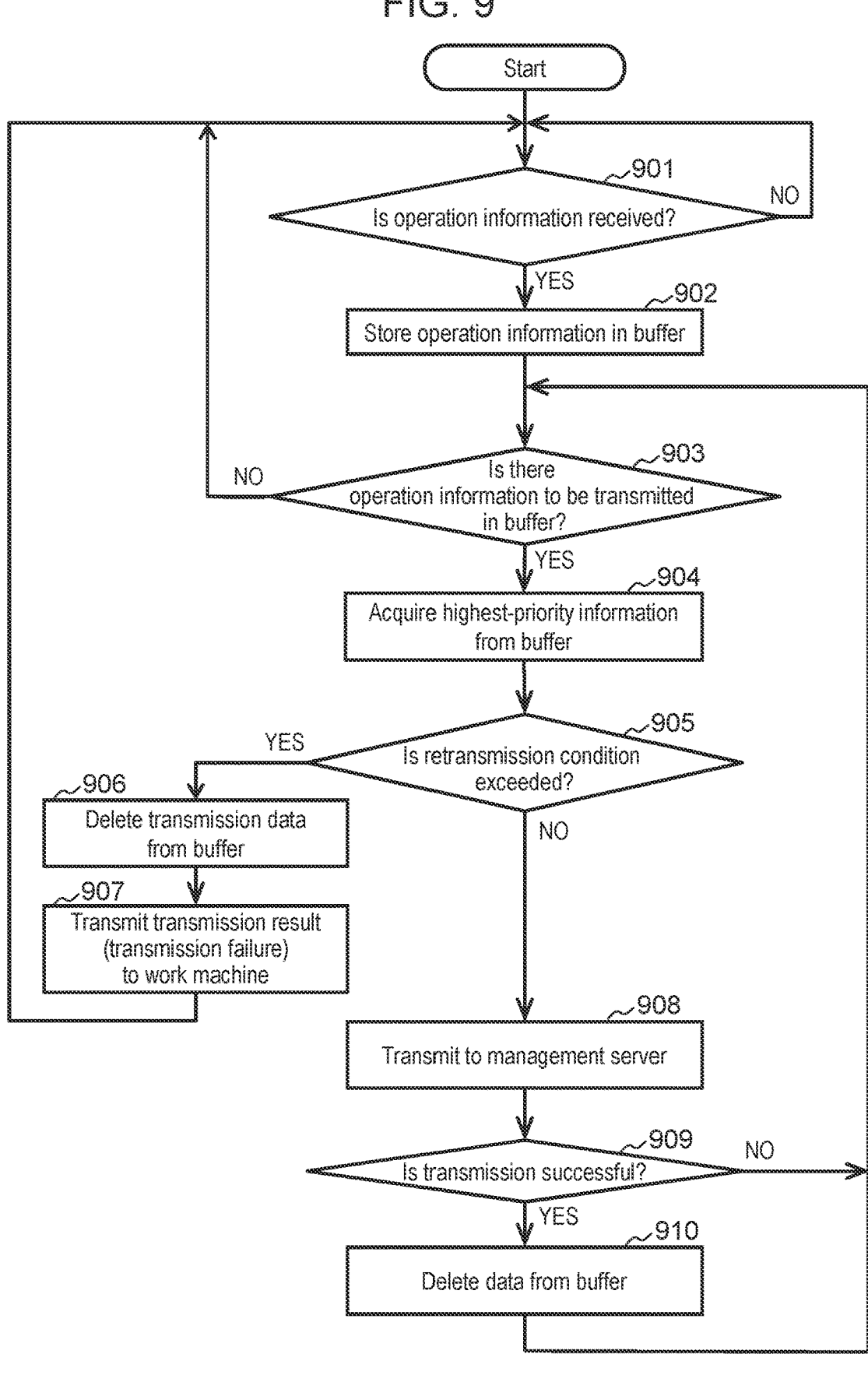
FIG. 9 is a flowchart for describing a process example of the relay of Example 1.

Next, with reference to FIG. 9, the process of the relay 80 is described. FIG. 9 is a flowchart for describing a process example of the relay 80 of Example 1.

First, in step 901, the operation information sent from the work machines 10 around the relay 80 is received by short-distance communication. When the operation information is received, the operation information is stored in an internal buffer in step 902. If the operation information is not received, the process returns again to step 901 to wait for reception.

Next, in step 903, it is confirmed whether there is operation information stored in the buffer. If the buffer is vacant, the process returns to step 901 and waits for reception. If there is operation information in the buffer, the operation information having the highest transmission priority order is acquired from the buffer in step 904.

In step 905, the retransmission condition of the acquired operation information is confirmed. If the retransmission condition is not satisfied (step 905: YES; for example, when the predetermined number of retransmissions is exceeded, or the predetermined retransmission time-out time is passed), transmission failure is recognized, and the process proceeds to step 906. In step 906, the operation information (more strictly, a corresponding packet) is deleted from the buffer, and a notice of transmission failure is transmitted as a transmission result in step 907 to the relay-requesting work machine 10.

On the other hand, if the retransmission condition is satisfied (step 905: NO), the operation information is transmitted to the management server in step 908. For this communication, long-distance communication is used. In step 909, the success or failure of the communication in step 908 is confirmed, and, if successful, the step process proceeds to 910. In step 910, the relevant operation information is deleted from the buffer, and then the process returns to step 903. Depending on the communication scheme, a notice of successful transmission may be transmitted as a transmission result to the relay-requesting work machine 10 in step 910.

On the other hand, if the communication was unsuccessful in step 909, the number of retransmissions of the operation information is increased by one, and then the process returns to step 901.

As described above, according to the present example, the operation information of a work machine having a greater failure risk is given priority over a work machine having a smaller failure risk, so that the operation information can reach the management server 90 more reliably. As a result, the manager can know abnormality in a work machine having a greater failure risk early and take measures.

Thus, in the work machine 10 and the work machine management system according to Example 1, even when the number of the work machines 10 is large, the information of a high-priority work machine 10 can be more appropriately transmitted.

In Example 1, because the management server information includes the vehicle body priority level, the work machine 10 does not need to determine its own vehicle body priority level, and the configuration of the information controller 20 is simplified.

Further, in Example 1, because the management server 90 determines the vehicle body priority level based on failure probability, work importance level, the availability of replacement machine, and the like, the vehicle body priority level can be determined taking various causes into consideration.

Further, in a variation of Example 1, when the management server information includes failure probability, work importance level, the availability of replacement machine, and the like, each work machine 10 can determine its own vehicle body priority level independently, and the configuration of the management server 90 is simplified.

Further, in Example 1, because the management server 90 outputs the input interface screen of FIG. 3(*b*) to the display device 92, the failure probability, work importance level, the availability of replacement machine, and the like can be input easily.

Further, in a variation of Example 1, when the operation information retransmission interval, the number of retransmissions, the retransmission time-out value, and the like are determined in accordance with the transmission priority order, retransmission of the operation information having a higher transmission priority order can be attempted more often.

Further, in a variation of Example 1, when the transmission interval or the amount of transmission of the operation information is determined in accordance with the transmission priority order, the operation information having a higher transmission priority order can be transmitted more quickly, or the operation information having a higher transmission priority order can be transmitted without a decrease in the amount of information.

Example 2

Figure 10:
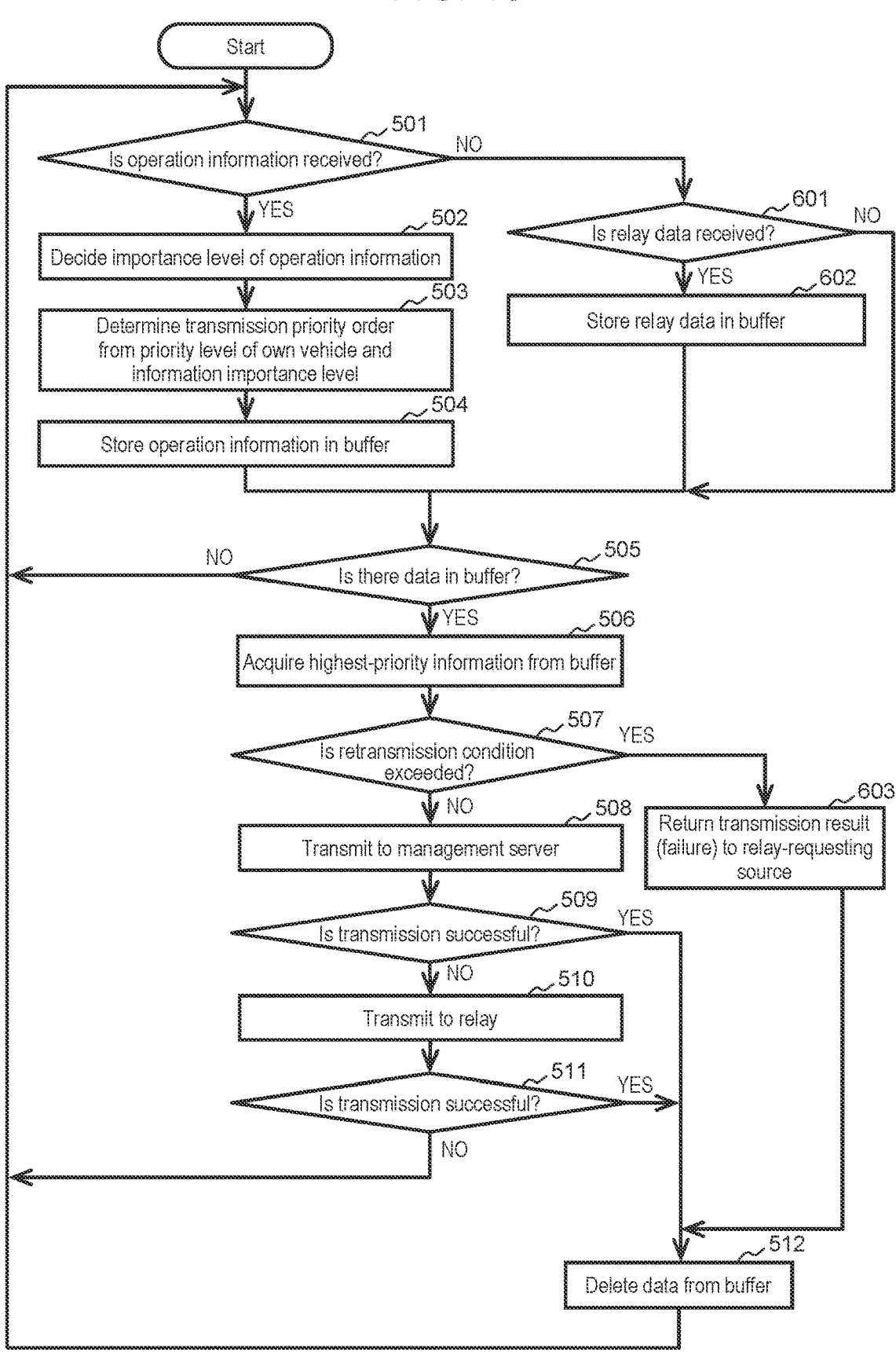
FIG. 10 is a flowchart for describing a process example of an information controller of Example 2.

Next, Example 2 of the present invention is described. FIG. 10 is a flowchart for describing a process example of the information controller 20 of Example 2. Example 2 is a case of Example 1 wherein the work machine 10 also operates as the relay 80.

The overall configuration of the work machine management system and the configuration of the work machine 10 are common to those described in Example 1 (FIG. 2 and FIG. 4), and, therefore, their description is omitted. Also, in the flowchart of FIG. 10, the portions common to the flowchart of FIG. 5 for the first example may be given similar signs and overlapping description may be omitted.

In FIG. 10, if the monitoring unit 201 does not acquire the operation information (first operation information) in step 501, the process proceeds to step 601. In step 601, the information transmission/reception unit 208 receives, as relay data, the operation information (second operation information) sent from another work machine 10 via the communication controller 50. For this communication, short-distance communication is used. If the operation information is not received in step 601, the process proceeds to step 505.

On the other hand, if the second operation information is received in step 601, the second operation information is stored in the buffer unit 202 in step 602. At this time, the packet of the received second operation information indicates the transmission priority order as illustrated in FIG. 8. That is, the information controller 20 can receive from the other work machine the second operation information and the transmission priority order of the second operation information.

In this way, in step 602, data of the same format as the first operation information stored in step 504 is stored. Accordingly, in the subsequent step 505 to step 511, by performing a process similar to Example 1, the operation information of the work machine 10 (first operation information) in which the information controller 20 is mounted and the operation information (second operation information) to be relayed are treated similarly, and data having a higher priority order is acquired in step 506 and transmitted in step 508. That is, the information controller 20 transmits one of the first operation information and the second operation information that has a higher transmission priority order preferentially, based on the transmission priority order of the first operation information and the transmission priority order of the second operation information.

If in step 507 the retransmission condition of the second operation information is not satisfied (transmission failure), a result to that effect is transmitted in step 603 to the requesting work machine 10, and the process proceeds to step 512. If the transmission is successful in step 509 and step 511, the process also proceeds to step 512.

As described above, according to the present example, even when a dedicated relay 80 cannot be installed at the work site, the work machine 10 itself can function as a relay to expand the range of communication. In this case, too, because the operation information of a work machine having a greater failure risk is given priority over a work machine having a smaller failure risk, the operation information can reach the management server 90 more reliably. As a result, the manager can know abnormality in a work machine having a greater failure risk early, and take measures.

Also, with respect to the other effects, similar effects to those of Example 1 can be obtained.

It is noted that the method for selecting one of the plurality of work machines 10 that is operated as the relay 80 may be determined by a person skilled in the art as appropriate. For example, a configuration may be adopted wherein a work machine capable of communicating with the management server directly (for example, the one having a long-distance communication function), or a work machine that has actually been operated as a relay is selected. Further, the plurality of work machines 10 may each function as the relay 80, so that communication can be achieved in a bucket brigade manner.

Other Examples

In Example 1 or 2, in addition to the variations described above, following variations are also possible.

In Example 1 and 2, the management server 90 transmits the vehicle body priority level to each work machine 10 as part of the management server information. As a variation, the vehicle body priority level may be determined by each work machine 10. In this case, the management server 90 may transmit information for determining the vehicle body priority level to each work machine 10.

For example, the management server 90 may transmit at least one of the failure probability, the work importance level, or the availability of replacement machine as the management server information to each work machine 10. Further, each work machine 10 may determine the transmission priority order of the operation information based on the content of the operation information and the received management server information. Concrete determination may be performed by the method described with reference to FIG. 3(a) in Example 1, for example.

REFERENCE SIGNS LIST

10 Work machine
12 Own vehicle priority (vehicle body priority level)
20 Information controller (controller)
30 Engine controller
31, 41 Sensor
32, 42 Device unit
40 Vehicle body controller
50 Communication controller
51, 81 Long-distance communication device
52, 82 Short-distance communication device
53 GPS antenna
60 Vehicle body network
80 Relay
90 Management server
91 Failure risk information,
92 Display device
201 Monitoring unit

202 Buffer unit
203 Importance level decision unit
204 Importance level correspondence table
206 Priority order determination table
207 Priority order determination unit
208 Information transmission/reception unit
209 Internal clock
1110 Upper revolving structure
1111 Cab
1112 Operating lever
1120 Lower travelling structure
1121 Tracks
1130 Work implement
1131 Boom
1132 Arm
1133 Bucket
1140 Revolving mechanism
1160 Cylinder All publications, patents, and patent applications cited in the present description are incorporated herein by reference in their entirety.

The invention claimed is:

1. A work machine comprising:
a controller that acquires first operation information of the work machine and receives management server information from a management server provided outside the work machine;
a long-distance communication device, coupled to the controller, configured to communicate via mobile communication networks; and
a short-distance communication device coupled to the controller,
wherein:
the first operation information includes information indicating at least one of a key signal, an overheat signal, an engine hydraulic pressure, an engine actual rotational speed, a water temperature, an air filter pressure difference, or a main hydraulic pump pressure;
the management server information includes a vehicle body priority level indicating a priority order between the work machine and another work machine, and at least one of a failure probability of the work machine, an importance level of the work machine in an on-site work, or a probability that the work machine can be replaced by another work machine; and
wherein the controller is configured to:
determine a transmission priority order of the first operation information based on content of the first operation information and the management server information, and
transmit, via the long-distance communication device or the short-distance communication device, the first operation information to the management server or a relay according to the transmission priority order.

2. The work machine according to claim 1, wherein the controller transmits the transmission priority order in association with the first operation information.

3. The work machine according to claim 2, wherein the controller is configured to:
receive second operation information and a transmission priority order of the second operation information from another work machine, and
preferentially transmit one of the first operation information and the second operation information that has a higher transmission priority order to the management server or the relay, based on the transmission priority order of the first operation information and the transmission priority order of the second operation information,
wherein the second operation information includes information indicating at least one of a key signal, an overheat signal, an engine hydraulic pressure, an engine actual rotational speed, a water temperature, an air filter pressure difference, or a main hydraulic pump pressure.

4. The work machine according to claim 1, wherein the controller determines at least one of a retransmission interval of the first operation information, a number of retransmissions of the first operation information, or a retransmission time-out value of the first operation information, in accordance with the transmission priority order.

5. The work machine according to claim 1, wherein the controller determines, in accordance with the transmission priority order:
a transmission interval of the first operation information, or
an amount of the first operation information transmitted in a single transmission process.

6. A work machine management system comprising the work machine and the management server of claim 1, wherein
the management server determines the vehicle body priority level based on at least one of a failure probability of the work machine, an importance level of the work machine in an on-site work, or a probability that the work machine can be replaced by another work machine.

7. The work machine management system according to claim 6, wherein the management server outputs to a display device an input interface screen for inputting information used for determining the vehicle body priority level.

* * * * *